Oct. 26, 1965    J. R. SETINA    3,214,211
AUTOMOBILE PARTITION APPARATUS
Filed Jan. 27, 1964    2 Sheets-Sheet 1

JOHN R. SETINA
INVENTOR.

BY
BUCKHORN, BLORE, KLARQUIST & SPARKMAN
ATTORNEYS

Oct. 26, 1965   J. R. SETINA   3,214,211
AUTOMOBILE PARTITION APPARATUS
Filed Jan. 27, 1964   2 Sheets-Sheet 2
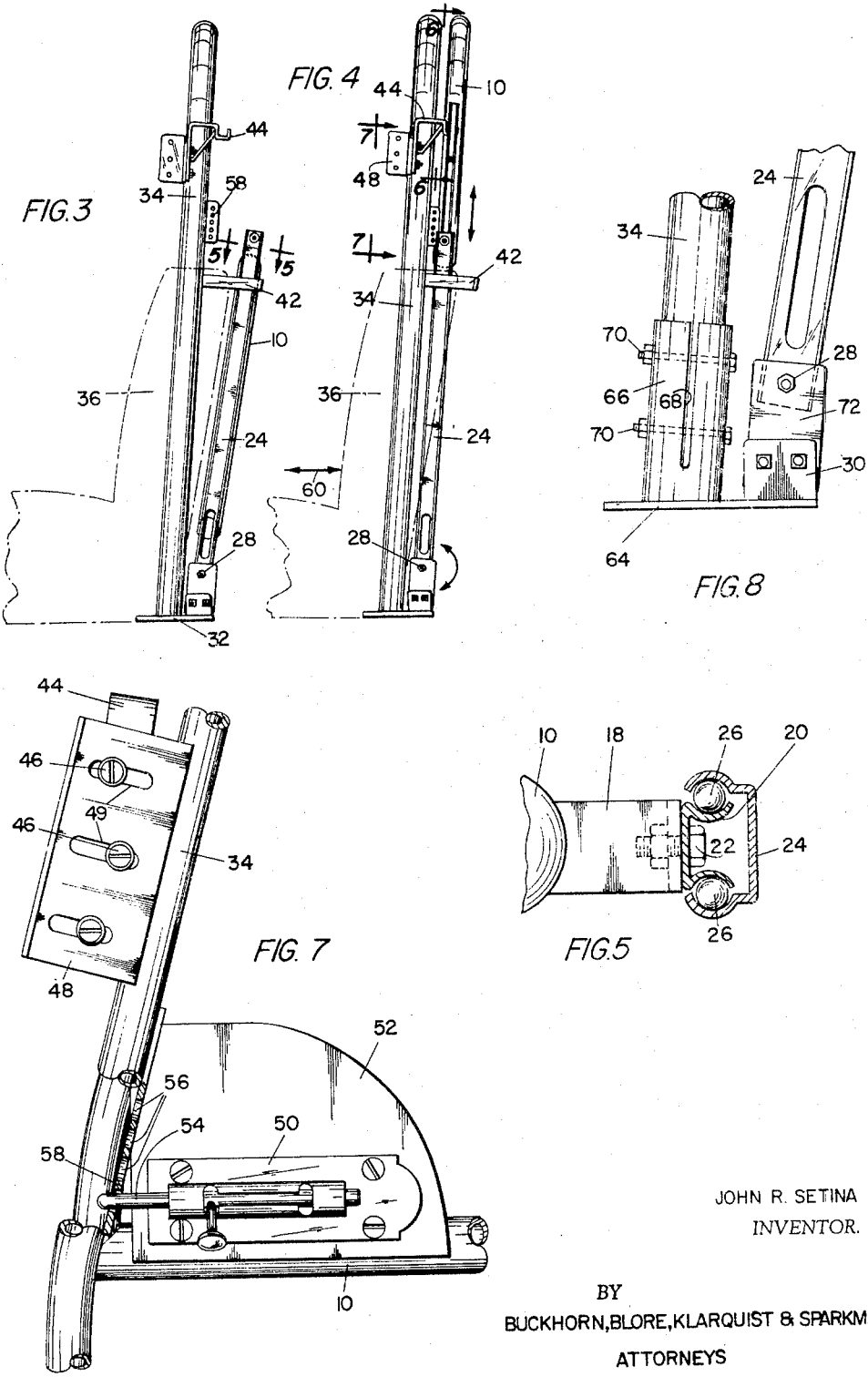

United States Patent Office 3,214,211
Patented Oct. 26, 1965

3,214,211
AUTOMOBILE PARTITION APPARATUS
John R. Setina, Rte. 5, Box 522, Olympia, Wash.
Filed Jan. 27, 1964, Ser. No. 340,445
7 Claims. (Cl. 296—24)

The subject matter of the present invention relates generally to a partition apparatus for providing a closed compartment within a passenger vehicle and in particular to an automobile partition apparatus including a sliding partition window which is pivoted and moved between an upper operating position located between the top of the backrest portion of a seat and the roof of such automobile and a lower storage position behind such seat.

The automobile partition of the present invention is especially useful when employed within police cars, or taxi cabs. However it may also be used in conventional passenger cars or trucks. Thus the present partition may be employed to enclose a prisoner within an escape proof compartment in the rear seat of a police car, or to prevent passengers from attacking and robbing the driver of a taxi cab. It may also be employed to enclose dogs or other animals in the rear end of a station wagon type automobile or truck.

The present automobile partition has several advantages over previous partitions, including a simple and inexpensive structure which operates in an uncomplicated and trouble-free manner. The partition apparatus of the present invention may be mounted on a roll bar which is attached to the frame of the automobile to prevent the roof of such automobile from collapsing when it overturns. Thus the present apparatus makes the automobile safer by means of a roll bar as well as by employing the partition. The partition of the present invention also allows greater visibility for the driver than previous automobile partitions so that there are no "blind spots" which would prevent him from seeing through the rear or side windows of the automobile.

The present partition may be moved to a lower position behind the front seat of the automobile when it is not in use for more compact storage of such partition out of the way of passengers riding in the rear seat. Futhermore, when the partition is raised to its upper operating position, it still allows the front seat to be adjusted back and forth to compensate for the different heights of drivers, while still maintaining a closed compartment in the rear seat of the automobile. In addition one embodiment of the present partition apparatus enables the heights of the roll bar and the upper position of the partition to be adjusted to compensate for the varying distances between the floor and roof of different model automobiles.

Briefly one embodiment of the automobile partition apparatus of the present invention includes a light transparent partition window of substantially unbreakable plastic mounted within a frame for sliding movement on a pair of tracks attached to the opposite sides of such frame. An outer track member of each pair of tracks is pivotally mounted at one end of such track member on a different one of a pair of anchor plates for a roll bar at the floor of the automobile. This enables the frame of the partition window to be engaged by and to be disengaged from a pair of hooks attached to the posts of such roll bar for holding the partition in an operating upper position between the top of the backrest of the front seat and the roof of such automobile. When raised the partition and the backrest of the front seat form a closed compartment in the rear of a police car since the rear doors may be provided with locks which open only from the outside of the automobile and with rear windows which cannot be raised or lowered from the rear seat. In addition the partition apparatus may be provided with a pair of stop members attached to the posts of the roll bar for supporting the partition in a stored lower position behind the rear seat with such partition inclined rearwardly at a slight angle to compensate for the slope of the backrest of the front seat and supported away from the back seat to provide adequate leg room for passengers on such back seat.

It is therefore one object of the present invention to provide an improved partition apparatus having a simple and inexpensive structure which operates in an uncomplicated and trouble-free manner.

Another object of the invention is to provide an improved automobile partition for providing a closed compartment within an automobile which allows the driver of the automobile greater visibility.

A further object of the present invention is to provide an improved automobile partition which may be pivoted and slid between an operative upper position and a lower position for compact storage thereof.

An additional object of the present invention is to provide an improved automobile partition which allows a front seat of the automobile to be adjusted back and forth to compensate for the different heights of the drivers of such automobiles.

Still another object of the invention is to provide an improved automobile partition apparatus which employs a roll bar to prevent the roof of the automobile from collapsing and for supporting the partition to make an automobile safer.

A still further object of the present invention is to provide an improved automobile partition apparatus employing a roll bar whose height may be adjusted as well as the upper position of the partition supported on such roll bar in order to compensate for variations in the distance between the floor and the roof of automobiles of different manufacture.

Other objects and advantages of the present invention will be apparent from the following detailed description of certain embodiments thereof and from the attached drawings of which:

FIG. 3 is a side view of the partition apparatus of FIGS. 1 and 2 with the partition in its stored lower position;

FIG. 4 is a side view of the partition apparatus of FIGS. 1 and 2 with the partition located in its operative upper position;

FIG. 5 is an enlarged section view taken along the line 5—5 of FIG. 3 showing the internal construction of one of the pair of sliding tracks;

FIG. 7 is an enlarged view taken along lines 7—7 of FIG. 4 showing one of the locks employed for the partition apparatus with parts broken away for clarity; and FIG. 8 is a side view of another embodiment of the mounting bracket of the roll bar employed in the partition apparatus of the present invention.

Figure 1:
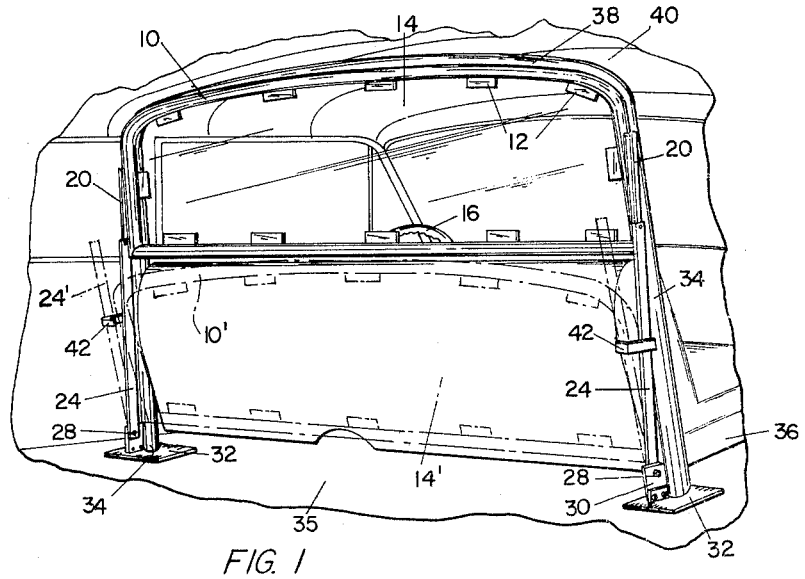
FIG. 1 is a perspective view of the automobile partition apparatus of the present invention shown installed adjacent the front seat of an automobile.
Figure 2:
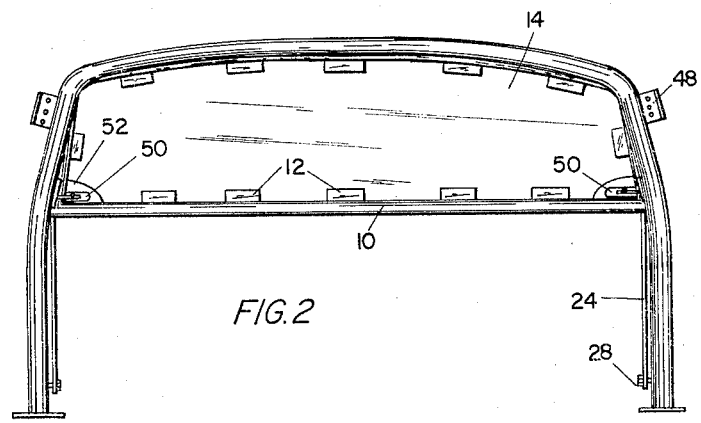
FIG. 2 is a plan view of the front of the partition apparatus of FIG. 1.
Figure 6:
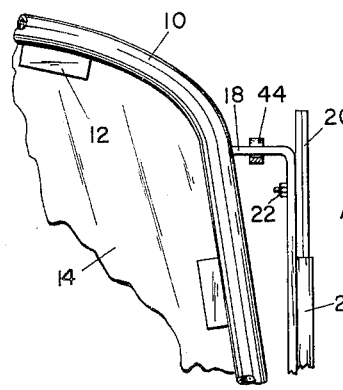
FIG. 6 is an enlarged section view taken along the line 6—6 of FIG. 4, showing a portion of one side of the partition frame.

As shown in FIGS. 1 and 2, one embodiment of the partition apparatus of the present invention includes a partition frame 10 of tubular metal having a plurality of inwardly extending support plates 12 welded or otherwise rigidly secured to such frame and a light transparent partition window 14 of unbreakable glass or plastic mounted within such frame between such support plates. Of course it is also possible to form the window 14 out of heavy wire mesh, however this type of construction does not give as clear visibility to the driver sitting behind the steering wheel 16 of the automobile. As shown in FIGS. 5 and 6, the partition frame 10 is provided with a pair of shoulder members 18 in the form of L-shaped brackets welded to the opposite sides of the frame. To each of these shoulder members is attached a separate inner track member 20 by means of bolts 22. The inner track member 20 is slideably mounted within an outer track member 24 on ball bearings 26. The lower ends of both of the outer track members 24 are pivotally attached by means of bolts 28 to a pair of support brackets 30 secured to a pair of anchor plates 32 formed at the ends of a pair of support posts 34 of a U-shaped roll bar. The anchor plates 32 of the roll bar are attached to the floor 35 of the automobile by bolts on opposite sides of the front seat 36 adjacent the door posts of such automobile so that the curved intermediate portion 38 of the roll bar is positioned in contact with or closely adjacent the roof 40 of the automobile.

As shown in FIG. 1 the two sliding tracks formed by the two pairs of track members 20 and 24 at the opposite sides of the partition frame 10 enable such frame to move from the operative upper position shown in solid lines to the stored lower position shown in dotted lines indicated by reference numeral 10'. In the lower position of the partition the frame 10 is located behind the front seat 36 of the automobile and is held by means of a pair of L-shaped stop members 42 so that such frame is inclined rearwardly at a slight angle with respect to the roll bar posts 34, as shown in FIG. 3. This slight angle of inclination is necessary to compensate for the rearward slope of the backrest of the front seat 36. In order to raise the partition from the stored lower position shown in FIG. 3 to the operative upper position in FIG. 4, it is only necessary to pull the partition frame upward to cause the inner track member 20 to slide within the outer track member 24 and to pivot such track members about bolts 28 in a counter clockwise direction. The partition is held in this upper position by means of a pair of hooks 44 which are attached to the roll bar posts 34 near the top of such posts. As shown in FIG. 6 these hooks 44 engage the shoulder portions 18 of the frame 10 when such frame is lowered onto such hooks. The partition frame is disengaged from the hooks 44 by raising such frame and rotating it clockwise about the pivots 28 of the outer track member 24. Then the partition is lowered to the storage position of FIG. 3 and held by stop members 42.

The hooks 44 are attached by means of bolts 46 to a pair of mounting plates welded to the roll bar posts 34 and a pair of mounting brackets 48 may also be attached to such mounting plates by means of such bolts passing through elongated adjustment slots 49 in such brackets. The mounting brackets 48 may be provided with a plurality of circular apertures for bolting such mounting bracket to the door post portions of the automobile in order to hold the roll bar securely in place.

As shown in FIGS. 2 and 7 the automobile partition of the present invention may be provided with a pair of bolt action locks 50 mounted on support plates 52 secured to the lower corners at the opposite sides of the partition frame 10 in front of the partition window 14 so that such locks may only be fastened and released by persons sitting in the front seat. The shafts of the lock bolts 54 are each inserted into one of a plurality of holes 56 provided in a pair of latch plates 58 welded to the roll bar posts 34 to prevent the partition frame from moving with respect to such roll bar. Several holes are provided in the latch plate because the uppermost of the position of the partition may be varied by vertically adjusting the position of the hooks 44 to ensure that the top of the backrest of the front seat 36 is closely adjacent to the lower edge of the partition frame 10 when such frame is located in the upper position FIG. 4. This allows the height of the front seat to vary somewhat with different types of automobiles while still enabling the partition to form a closed compartment in the rear of the automobile. Also the front seat may be adjusted back and forth in the horizontal direction of arrows 60 in FIG. 4 to compensate for the different heights of the drivers while maintaining such rear compartment closed. It should be noted that the amount of horizontal adjustment of the front seat is determined by the width of the backrest portion of such seat and that the front seat is located in its forwardmost position in FIG. 4.

Since the distance between the roof 40 and the floor 35 of the automobile varies with different types of automobiles, it may be necessary to provide a separate anchor plate 64 for each of the roll bar posts 34 to adjust the height of such roll bar. Anchor plate 64 is provided with a tubular post receiving portion 66 having an elongated slot 68 provided therein for enabling such post receiver member to be compressed by means of a pair of bolts 70 extending through openings in such member and the roll bar posts to anchor such posts to the tubular member 66 on the anchor plate 64. Thus in order to change the height of the roll bar it is only necessary to replace the anchor plate 64 with one having a longer post receiving member 66 with bolt holes at a greater distance from the base of the anchor plate. Of course it is also possible to provide a plurality of bolt holes of different heights in the same receiver member 66 to accomplish this height adjustment. The outer track member 24 is attached to the anchor plate by means of the pivot bolt 28 in a similar manner to the previously described embodiment of FIGS. 1 to 7. An intermediate connector plate 72 may be bolted onto the support bracket 30 of the anchor plate and the pivot bolt attached to such connector plate. This connector plate 72 may also be employed with the permanent anchor plate 32 of FIGS. 1 to 7 and functions to enable the height of the pivot bolt 28 and the outer track member 24 attached thereto to vary by providing such connector plate with a plurality of pivot bolt apertures of different heights.

It will be obvious to those having ordinary skill in the art that various changes may be made to the above described preferred embodiments of the present invention without departing from the spirit of the invention. For example, the roll bar may be made in two pieces for telescoping adjustment of the intermediate portion 38 at the top of such roll bar to vary the width of the roll bar to compensate for changes in the widths of different automobiles. If this is done a pair of adapter plates may be fastened in between the frame of the partition and the inner track members to fill the space resulting from any increase in the distance between such inner track member due to increasing the width of roll bar. Furthermore, a pair of counterbalancing springs may be attached between the top of the posts of the roll bar and the bottom of the inner track members to aid in the lifting of the partition. Of course the roll bar may be eliminated entirely and the brackets hooks 44 and stop members 42 attached to the door posts of the automobile instead of such roll bar. Also the partition apparatus may be secured in a position to form a closed compartment with the rear seat, rather than the front seat, of a station wagon or similar type automobile. Therefore the scope of the present invention should only be determined by the following claims.

I claim:

1. Partition apparatus for a vehicle having passenger seats comprising:

a light transparent partition of substantially unbreakable construction;

a partition frame supporting said partition;

track means attached to said frame to enable said partition to slide on said tracks between an extended position and a retracted position;

support means for supporting said frame in said extended position; and pivot means separate from said seats for attaching said track means to said vehicle for enabling said track means and said frame to pivot with respect to said seats between different angles of inclination to enable said partition to be supported above said seats in said extended position of said tracks so that said seats can be moved with respect to said partition for adjustment purposes.

2. Partition apparatus for use in a vehicle having passenger seats, comprising:
a light transparent partition window of substantially unbreakable construction;
a partition frame supporting said window;
track means including at least a first track member and a second track member which slides with respect to said first track member, said second track member being attached to said frame to enable said frame to slide on said first track member between an extended position and a retracted position;
support means for holding said frame in said extended position; and
pivot means for pivotally connecting one end of said first track member to said vehicle to enable said track means to pivot with respect to said seats to locate said partition window in a raised position above the back of said seats in said extended position of said frame and to position said partition window in a lowered position behind the back of said seats in said retracted position of said frame.

3. An automobile partition, comprising:
a light transparent partition window of substantially unbreakable construction;
a window frame supporting said window;
track means including a pair of first track members and a pair of second track members which are slideably mounted on said first track members, said second track members being attached to the opposite sides of said frame to enable said frame to slide on said first track members between an upper position and a lower position;
hook means for supporting said frame in said upper position;
a pair of support brackets each pivotally attached to the end of a different one of said first track members for anchoring them to the body of an automobile and enabling said track means to pivot for engagement and disengagement of said hook means by said frame; and
lock means for maintaining said frame in said upper position and preventing said frame from being moved to said lower position until said lock means is released.

4. An automobile partition, comprising:
a light transparent portion of substantially unbreakable construction;
a partition frame supporting said window;
a pair of tracks each including a first track member and a second track member which slides with respect to said first track member, said second track members being attached to spaced portions of said frame to enable said frame to slide on said tracks between an upper position above the top of the front seat of an automobile and a lower position below the top of said seat;
hook means for supporting said frame in upper position at a first angle of inclination;
a pair of support brackets each pivotally attached to the end of a different one of said first track members for anchoring them to the body of an automobile and enabling said track means to pivot for engagement and disengagement of said frame by said hook means;
stop means for limiting the angle through which said first track members can pivot and for supporting said frame behind said seat in said lower position at a second angle of inclination; and
lock means for maintaining said frame in said upper position and preventing said frame from being moved to said lower position until said lock means is released.

5. An automobile partition apparatus, comprising:
a roll bar for supporting the roof of an automobile to prevent said roof from collapsing when said automobile overturns, said roll bar including a pair of post portions joined by an intermediate portion extending laterally therefrom;
a partition window of substantially unbreakable light transparent plastic material;
a window frame surrounding said window;
a pair of tracks each including a first track member and a second track member which slides with respect to said first track member, said second track members being attached to the opposite sides of said frame to enable said frame to slide on said tracks between an extended position and a retracted position;
support means for holding said partition window in a raised position above the back rest of the front seats of said automobile, including means attached to said roll bar for engagement with other means on said frame;
a pair of support brackets each secured to the end of a different one of the post portions of said roll bar and pivotally attached to the end of a different one of said first track members for anchoring them to the floor of an automobile and enabling said track means to pivot with respect to such front seats for engagement and disengagement of said support means; and
lock means for locking said frame to said roll bar in the raised and extended position of said frame to prevent said frame from being moved to said lower position until said lock means is released.

6. An automobile partition apparatus, comprising:
an automobile having a front seat and a back seat;
a roll bar;
a light transparent partition window of substantially unbreakable construction;
a partition frame supporting said window;
track means including at least a first track member and a second track member which slides with respect to said first track member, said second track member being attached to said frame to enable said frame to slide on said first track member between an upper position above the top of said front seat and a lower position below the top of said front seat;
hook means for supporting said frame on said roll bar in said upper position;
anchor means for securing said roll bar to the floor of said automobile and for pivotally attaching the ends of said first track members to the ends of said roll bar to enable said track means to pivot for engagement and disengagement of said frame by said hook means; and
lock means for locking said frame to said roll bar in said upper position and preventing said frame from being moved to said lower position until said lock means is released.

7. An automobile partition apparatus, comprising:
a light transparent partition of substantially unbreakable construction;
telescoping track means including a pair of first track members attached to the opposite sides of said partition and a pair of second track members slideably attached to said first track members, for moving said partition between an extended position in which said first track members extend out of said second track members and a retracted position in which said first track members extend further into said second track members;
a roll bar including a pair of spaced post portions joined by a top portion for supporting the roof of an automobile, said roll bar being separate from said track means and said post portions being substantially longer than said second track members;

fastening means connected between said roll bar and said track means, for attaching said second track members to different ones of said pair of post portions of said roll bar so that said second track members are separate from and in spaced relationship to said post portions; and means for holding said partition in said extended position and for releasing said partition to enable it to move to said retracted position.

References Cited by the Examiner

UNITED STATES PATENTS

| | | | |
|---|---|---|---|
| 2,502,538 | 4/50 | Stark | 296—85 |
| 2,782,069 | 2/57 | Storch | 296—85 X |
| 3,015,515 | 1/62 | Halstead et al. | 296—24 |

FOREIGN PATENTS 474,477  10/37  Great Britain.

BENJAMIN HERSH, *Primary Examiner.*